United States Patent [19]

Hara et al.

[11] Patent Number: 5,461,569
[45] Date of Patent: Oct. 24, 1995

[54] ABNORMALITY DIAGNOSTIC SYSTEM FOR INTERNAL COMBUSTION ENGINES

[75] Inventors: Fumio Hara; Masahiko Yakuwa, both of Wako, Japan

[73] Assignee: Honda Giken Kogyo K.K., Tokyo, Japan

[21] Appl. No.: 36,937

[22] Filed: Mar. 25, 1993

[30]  Foreign Application Priority Data

Mar. 30, 1992  [JP]  Japan .................................. 4-103516

[51]  Int. Cl.$^6$ .................................................. F02D 19/00
[52]  U.S. Cl. .................................. 364/431.03; 364/424.03;
364/431.11; 364/431.01; 123/571; 123/479;
123/520; 123/198 D; 73/118.1; 73/117.3;
371/5.1; 340/459; 340/870.09; 340/438
[58]  Field of Search .......................... 364/424.04, 424.06,
364/426.01, 426.02, 431.01–431.12; 123/479,
589, 520, 489, 571, 568, 569, 570, 519,
198 D; 340/52 F, 27 R, 52 R, 870.09, 10 R,
438; 73/118, 117.3, 116, 119 R, 118.1,
118.3, 115; 371/15, 16, 67, 13, 19, 20–29,
5.1

[56]  References Cited

U.S. PATENT DOCUMENTS

| | | | |
|---|---|---|---|
| 4,271,402 | 6/1981 | Kastura et al. | 364/424.04 |
| 4,277,772 | 7/1981 | Kastura et al. | 340/52 |
| 4,534,214 | 8/1985 | Takahashi | 73/118 |
| 4,546,647 | 10/1985 | Takahashi | 73/118 |
| 4,583,176 | 4/1986 | Yamato et al. | 364/431.11 |
| 4,681,954 | 10/1986 | Otobe et al. | 371/16 |
| 4,967,717 | 11/1990 | Miyazaki et al. | 123/571 |
| 5,033,290 | 7/1991 | Seki et al. | 73/118.1 |
| 5,111,686 | 5/1992 | Kamiya et al. | 73/117.3 |
| 5,230,319 | 7/1993 | Otsuka et al. | 123/520 |

FOREIGN PATENT DOCUMENTS

| | | |
|---|---|---|
| 58-27297 | 2/1983 | Japan . |
| 60-1733 | 9/1985 | Japan . |
| 63-37254 | 7/1988 | Japan . |

Primary Examiner—Kevin J. Teska
Assistant Examiner—Jacques H. Louis-Jacques
Attorney, Agent, or Firm—Arthur L. Lessler

[57]  ABSTRACT

The present invention provides a diagnostic system for an internal combustion engine which detects abnormalities of input/output objects used in controlling operation of the engine when the engine is in respective predetermined operating conditions, and carries out respective predetermined fail-safe actions when abnormalities of the input/output are detected. When an abnormality of the input/output objects was detected on the last occasion and has also been detected on the present occasion, and at the same time it is determined that a change in the operating environment of the engine has occurred between when the abnormality was detected on the last occasion and when it has been determined on the present occasion, occurrence of the abnormality is finally determined.

10 Claims, 8 Drawing Sheets

ABNORMALITY DIAGNOSTIC SYSTEM FOR INTERNAL COMBUSTION ENGINES

BACKGROUND OF THE INVENTION

1. Field of the Invention

This invention relates to an abnormality diagnostic system for internal combustion engines, and more particularly to an abnormality diagnostic system which is adapted to detect abnormalities in input/output objects such as an air-fuel ratio feedback control system thereof and an exhaust gas recirculation system of the engine when the engine is in predetermined operating conditions.

2. Prior Art

Conventionally, the method of detecting abnormalities in an internal combustion engine for automotive vehicles, which is equipped with electronic control systems, can be classified into three kinds as follows:

(i) A method which comprises always monitoring an output value from a temperature sensor or a pressure sensor such as an engine coolant temperature (TW) sensor, an intake air temperature (TA) sensor, and an atmospheric pressure (PA) sensor, and detecting whether there is an abnormality in the sensor, based upon the output value (e.g. Japanese Patent Publication (Kokoku) No. 63(1988)-37254);

(ii) A method which detects an abnormality in a timing system of the engine and comprises monitoring a timing pulse signal generated at predetermined crank angles in synchronism with the engine rotation, such as an output pulse signal from a TDC sensor, and detects whether or not there is an abnormality in the timing system, based upon whether or not a pulse is omitted from the timing pulses (e.g. Japanese Provisional Patent Publication (Kokai) No. 58(1983)-27297); and (iii) A method which comprises carrying out, by means of logical comparison, detection of an abnormality in an oxygen concentration ($O_2$) sensor, an exhaust gas recirculation system or an air-fuel ratio feedback control system, which require limited abnormality-detecting conditions, when the engine is in predetermined operating conditions (e.g. Japanese Provisional Patent Publication (Kokai) No. 60(1985)-173332).

According to these conventional methods, it is determined that there is an abnormality in the engine when an output from a particular component part such as a sensor or a control variable used in a control system such as the air-fuel ratio feedback control system continuously shows a value falling outside a predetermined allowable range over a predetermined time period or a predetermined number of times. When an abnormality is detected, a predetermined fail-safe action is immediately taken, while turning on a warning lamp mounted on a dashboard in the vehicle compartment to warn the occupant(s) of the occurrence of the abnormality.

However, of the above conventional abnormality-detecting methods, the methods (i) and (ii), which detect abnormalities in sensors, etc. in direct manners, are relatively reliable, while according to the method (iii), which detects abnormality based upon results of a logical comparison, accurate abnormality detection is difficult to carry out under all possible environmental conditions. For example, the engine can be determined to be abnormal due to an incidental external factor, even when the engine is normally operating.

More specifically, for example, when the $O_2$ sensor is wet with rain water entering the engine room in rainy weather or during traveling at the waterside, it can be erroneously determined that the $O_2$ sensor is faulty, even when it is normally functioning. In the case of the exhaust gas recirculation system, when dust is temporarily caught in an exhaust gas recirculation valve thereof or when the operating pressure for the exhaust gas recirculation valve is too low during traveling at a high altitude, etc., the valve cannot operate as desired so that the exhaust gas recirculation system can temporarily malfunction. Even in such a case, it can be determined that there is an abnormality in the exhaust gas recirculation system. Further, in an internal combustion engine equipped with an evaporative emission control system having a canister which temporarily stores evaporative fuel from a fuel tank and from which the evaporative fuel is purged into the intake system of the engine to prevent emission of evaporative fuel to the outside of the engine, a control variable used in the air-fuel ratio feedback control system is feedback-controlled to a small value when evaporative fuel is purged in large quantities from the canister. On such an occasion, the value of the control variable can exceed a predetermined abnormality-determining value, resulting in the determination that the air-fuel ratio feedback control system is malfunctioning, even when it is normally functioning.

As mentioned above, the conventional abnormality-detecting methods have the drawback that abnormality detection is carried out even when it should not be carried out, thus failing to achieve a desired abnormality diagnosis. Further, even a kind of abnormality which occurs temporarily or incidentally and is different from abnormalities which should be detected, is unnecessarily detected and displayed. As a result, checking at a service station or at a plant cannot find out the location of the abnormality or the cause of the abnormality, and in the worst case component parts which are considered to be faulty are unnecessarily replaced with new ones.

SUMMARY OF THE INVENTION

It is the object of the invention to provide an abnormality diagnostic system for an internal combustion engine, which is capable of detecting abnormalities in input/output objects used in controlling the operation of the engine with improved accuracy.

To attain the above object, the present invention provides an abnormality diagnostic system for an internal combustion engine, including abnormality detecting means for detecting abnormalities of input/output objects used in controlling the operation of the engine when the engine is in respective predetermined operating conditions, and fail-safe means for carrying out respective predetermined fail-safe actions when abnormalities of the input/output objects are detected by the abnormality-detecting means.

The abnormality diagnostic system according to the invention is characterized by comprising:

operating environmental change-determining means for determining whether there has occurred a change in operating environment of the engine between when the abnormality-detecting means detected an abnormality of the input/output objects on a last occasion and when it has detected the abnormality on a present occasion; and abnormality-determining means for finally determining occurrence of the abnormality of the input/output objects when the abnormality has been detected by the abnormality-detecting means and at the same time it is determined by the operating environmental change-determining means that a change in the operating environment of the engine has occurred between when the abnormality-detecting means detected the abnormality on the last occasion and when it has detected the abnormality on the present occasion.

Preferably, the abnormality diagnostic system includes display means for displaying the abnormality when the occurrence of the abnormality has been finally determined by the abnormality-determining means.

For example, the operating environmental change-determining means determines that a change in the operating environment of the engine has occurred, when temperature of the engine is lower than a predetermined value at the start of the engine.

Preferably, the temperature of the engine is the temperature of coolant in the engine.

Preferably, the abnormality diagnostic system includes detected abnormality data-storing means for storing data on abnormality of each of the input/output objects detected by the abnormality-detecting means, and stored abnormality data-erasing means for erasing the data on the abnormality of the each input/output object previously stored in the detected abnormality data-storing means when no abnormality is detected in the each input/output object by the abnormality-detecting means on the present occasion.

Further preferably, the abnormality diagnostic system includes input terminal means for inputting a predetermined external signal to the system, and wherein when the predetermined external signal is inputted, the abnormality-determining means finally determines occurrence of an abnormality of each of the input/output objects immediately when the abnormality of the each input/output object has been detected by the abnormality-detecting means, irrespective of whether or not it is determined by the operating environmental change-determining means that a change in the operating environment of the engine has occurred.

The above and other objects, features, and advantages of the invention will be more apparent from the following detailed description taken in conjunction with the accompanying drawings.

DETAILED DESCRIPTION

The invention will now be described in detail with reference to the drawings showing embodiments thereof.

Figure 1:
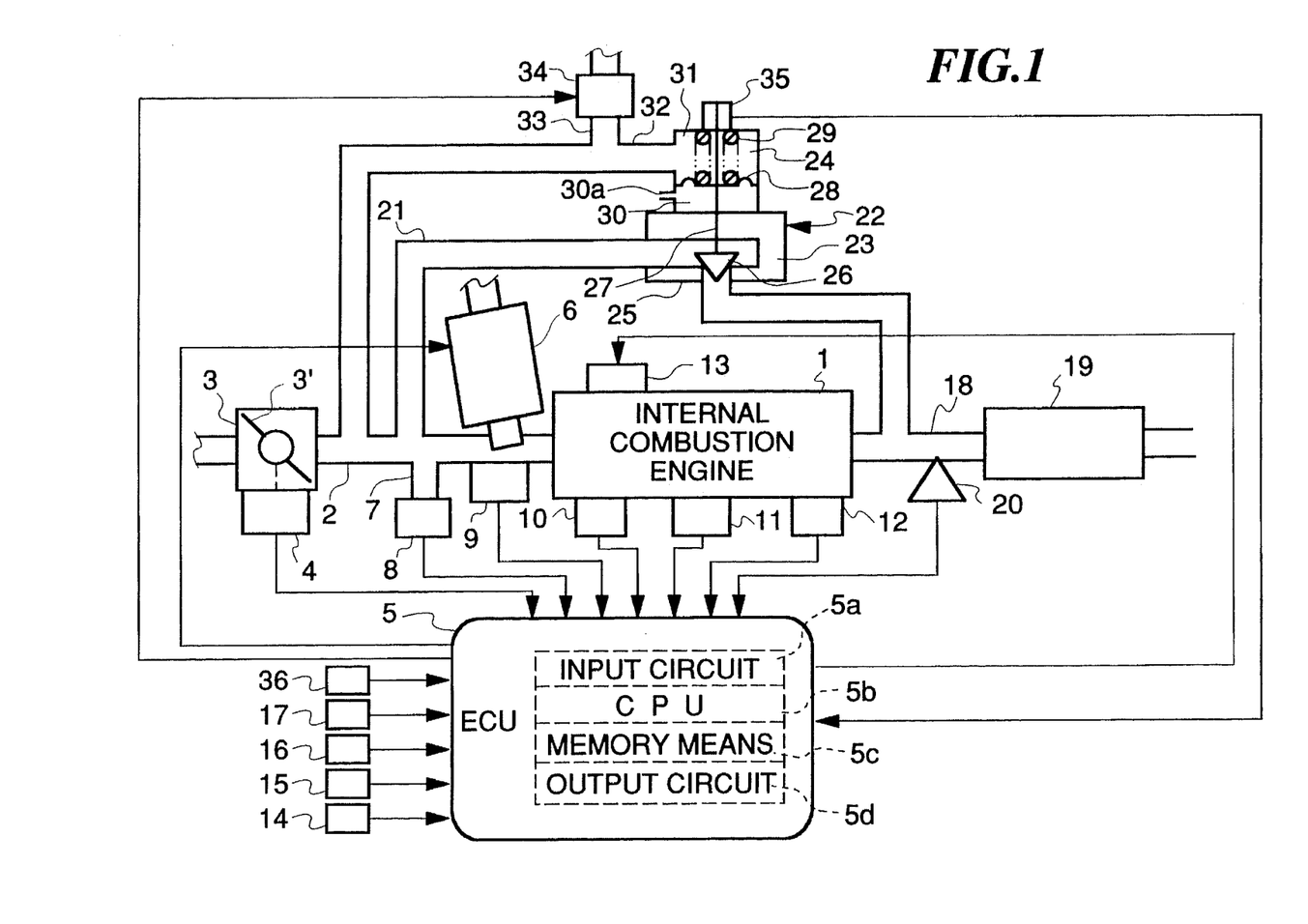
FIG. 1 is a block diagram showing the whole arrangement for an internal combustion engine and an abnormality diagnostic system therefor, according to an embodiment of the invention.

Referring first to FIG. 1, there is illustrated the whole arrangement of an internal combustion engine, and an abnormality diagnostic system therefor, according to an embodiment of the invention. In the figure, reference numeral 1 designates an internal combustion engine for automotive vehicles, which is a four-cylinder type, for instance. Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying same to an electronic control unit (hereinafter called "the ECU") 5.

Fuel injection valves 6, only one of which is shown, are inserted into the interior of the intake pipe 2 at locations intermediate between the cylinder block of the engine 1 and the throttle valve 3' and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 via a conduit 7 at a location immediately downstream of the throttle valve 3' for supplying an electric signal indicative of the sensed absolute pressure within the intake pipe 2 to the ECU 5.

An intake air temperature (TA) sensor 9 is inserted into a wall portion of the intake pipe 2 at a location downstream of the conduit 7, for supplying an electric signal indicative of the sensed intake air temperature TA to the ECU 5.

An engine coolant temperature (TW) sensor 10, which is formed of a thermistor or the like, is mounted in the cylinder block of the engine 1 which is filled with engine coolant, for supplying an electric signal indicative of the sensed engine coolant temperature TW to the ECU 5.

An engine rotational speed (NE) sensor 11 and a cylinder-discriminating (CYL) sensor 12 are arranged in facing relation to a camshaft or a crankshaft of the engine 1, not shown. The NE sensor 11 generates a pulse as a TDC signal pulse at each of predetermined crank angles whenever the crankshaft rotates through 180 degrees, and the cylinder-discriminating (CYL) sensor 12 generates a pulse at a predetermined crank angle of a particular cylinder of the engine, both the pulses being supplies to the ECU 5.

A spark plug 13 of each cylinder of the engine 1 is electrically connected to the ECU 5 to have its spark ignition timing controlled by a signal from the ECU 5.

Various other switch and sensors 14–17 are electrically connected to the ECU 5. The ignition switch (IGSW) 14 supplies the ECU 5 with a signal indicative of on and off states thereof. The atmospheric pressure (PA) sensor 15 is arranged at a suitable place in the engine 1 to sense atmospheric pressure and supply the ECU 5 with a signal indicative of the sensed atmospheric pressure PA. The vehicle speed (VSP) sensor 16 senses the traveling speed of a vehicle, not shown, in which the engine 1 is installed and supplies the ECU 5 with a signal indicative of the sensed vehicle speed VSP. The battery voltage (VB) sensor 17 senses output voltage VB from a battery, not shown, and supplies the ECU 5 with a signal indicative of the sensed output voltage VB.

A catalytic converter 19 which is formed of a three-way catalyst is arranged across an exhaust pipe 18 extending from exhaust ports, not shown, of the engine 1 to purify noxious components in exhaust gases from the engine 1 such as HC, CO, and NOx.

An oxygen concentration sensor (hereinafter referred to as "the $O_2$ sensor") 20 is arranged in the exhaust pipe 18, to sense the concentration of oxygen contained in the exhaust gases from the engine 1 and supply the ECU 5 with a signal indicative of the sensed oxygen concentration.

An exhaust gas recirculation passage 21 extends between the intake pipe 2 and the exhaust pipe 18 in a manner bypassing the engine 1, with one end thereof connected to the exhaust pipe 18 at a location upstream of the $O_2$ sensor 20, i.e. on the engine 1 side, and the other end to the intake pipe 2 at a location upstream of the PBA sensor 8, i.e. on the throttle valve 3' side. An exhaust gas recirculation amount control valve (hereinafter referred to as "the EGR valve") 22 is arranged across the exhaust gas recirculation passage 21 for regulating or varying the amount of exhaust gases being returned from the exhaust pipe 18 to the intake pipe 2. The EGR valve 22 has a casing 25 defining therein a valve chamber 23 and a diaphragm chamber 24, a valve element 26 arranged in the valve chamber 23 and being movable in vertical directions as viewed in the figure for opening and closing the exhaust gas recirculation passage 21, a diaphragm 28 arranged in the diaphragm chamber 24 and coupled to the valve element 26 via a valve stem 27, and a spring 29 urging the diaphragm 28 in a valve-closing direction. In the diaphragm chamber 24, the diaphragm 28 defines an atmospheric pressure chamber 30 and a vacuum chamber 31 at upper and lower sides thereof, respectively, as viewed in the figure. The atmospheric pressure chamber 30 is communicated with the atmosphere via a vent hole 30a, and the vacuum chamber 31 is connected to a vacuum passage 32.

The vacuum passage 32 is connected to the intake pipe 2 at a location between the throttle valve 3' and an end of the exhaust gas recirculation passage 21 opening into the intake pipe 2 so that absolute pressure PBA developed in the intake pipe 2 is introduced into the vacuum chamber 30 through the vacuum passage 32. An atmospheric pressure passage 33 branches off the vacuum passage 32, across which a pressure control valve 34 is arranged. The pressure control valve 34 is formed of a normally-open type solenoid valve and selectively supplies atmospheric pressure or vacuum to the vacuum chamber 31 of the diaphragm chamber 24 to cause generation of controlled pressure within the vacuum chamber 31.

When the pressure control valve 34 is energized to become closed, vacuum is developed in the vacuum chamber 31 so that the diaphragm 28 is upwardly displaced against the force of the spring 29 to increase the valve opening (lift) of the EGR valve 22. On the other hand, when the valve 34 is deenergized to become open, vacuum is decreased in the vacuum chamber 31 so that the diaphragm 28 is downwardly displaced by the force of the spring 29 to decrease the valve opening or lift of the EGR valve 22. By thus energizing and deenergizing the pressure control valve 34, the valve opening of the EGR valve 22 is controlled. The pressure control valve 34 is electrically connected to the ECU 5 to be opened and closed by a command signal from the ECU 5 to control the lift of the valve element 26 of the EGR valve 22 and the lifting speed thereof.

A valve opening (lift) sensor (hereinafter referred to as "the L sensor") 35 is connected to the EGR valve 22 to detect the operating position (lift) of the valve element 26 and supply the ECU 5 with a signal indicative of the detected operating position. The exhaust gas recirculation (EGR) control is carried out after completion of warming-up of the engine 1, e.g. when the engine coolant temperature TW is higher than a predetermined value.

Further, a service check signal (SCS) terminal 36 is connected to the ECU 5. The SCS terminal 36 can be short-circuited to ground by a jumper wire or the like, and then a warning lamp, not shown, of a combination meter, not shown, will be intermittently lighted a predetermined number of times to thereby enable estimation of a location where abnormality exists in the vehicle including the engine 1, an air-fuel ratio feedback control system, and the EGR control system. More specifically, several predetermined time numbers are allotted to several predetermined locations within the vehicle, respectively. It is designed that when the SCS terminal 36 is short-circuited, the warning lamp is intermittently lighted a predetermined number of times corresponding to the location which is determined to be abnormal, and then the operator will be able to locate the abnormal location.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter referred to as "the CPU") 5b, memory means 5c having a ROM storing various operational programs which are executed in the CPU 5b, various maps and tables, etc., and a RAM for storing results of calculations therefrom, etc., and an output circuit 5d which outputs driving signals to the fuel injection valves 6, the spark plugs 13, the pressure control valve 34, etc.

The ECU 5 operates in response to various engine operating parameter signals as mentioned above to determine various operating conditions in which the engine is operating, including an air-fuel ratio feedback control region and open-loop control regions and calculate a fuel injection period TOUT for the fuel injection valves 6 by the use of the following equation (1) in synchronism with generation of TDC signal pulses, in response to the determined operating conditions of the engine:

$$TOUT = Ti \times KEGR \times KWOT \times KO_2 \times K1 + K2 \qquad (1)$$

where Ti represents a basic value of the fuel injection period TOUT of the fuel injection valve 6 which is determined in accordance with the engine rotational speed NE and the intake pipe absolute pressure PBA.

KEGR represents an EGR-dependent fuel correction coefficient which is set in response to variations in the exhaust gas recirculation amount through the exhaust gas recirculation passage 21 to thereby correct the fuel amount so as to control the air-fuel ratio of a mixture supplied to the engine 1 to a stoichiometric ratio during air-fuel ratio feedback control, for instance.

KWOT represents an enriching coefficient which is set to a predetermined value appropriate to a predetermined high load operating condition of the engine for instance.

$KO_2$ represents an air-fuel ratio correction coefficient which is set in response to the concentration of oxygen contained in exhaust gases from the engine 1, i.e. in response to an output from the $O_2$ sensor 20, during air-fuel ratio feedback control which is carried out after completion of warming-up of the engine, while it is set to predetermined values appropriate, respectively, to predetermined operating regions (open-loop control regions) when the air-fuel ratio feedback control is not carried out.

K1 and K2 represent other correction coefficients and correction variables which are calculated in response to engine operating parameter signals to such values as to optimize various characteristics of the engine such as fuel consumption and accelerability.

The CPU 5b also forms abnormality-detecting means for detecting abnormalities in particular input/output objects, i.e. the $O_2$ sensor 20, the L sensor 35, the EGR valve 22, and the air-fuel ratio correction coefficient $KO_2$ in the present embodiment, when respective predetermined operating conditions of the engine are satisfied.

Figure 2:
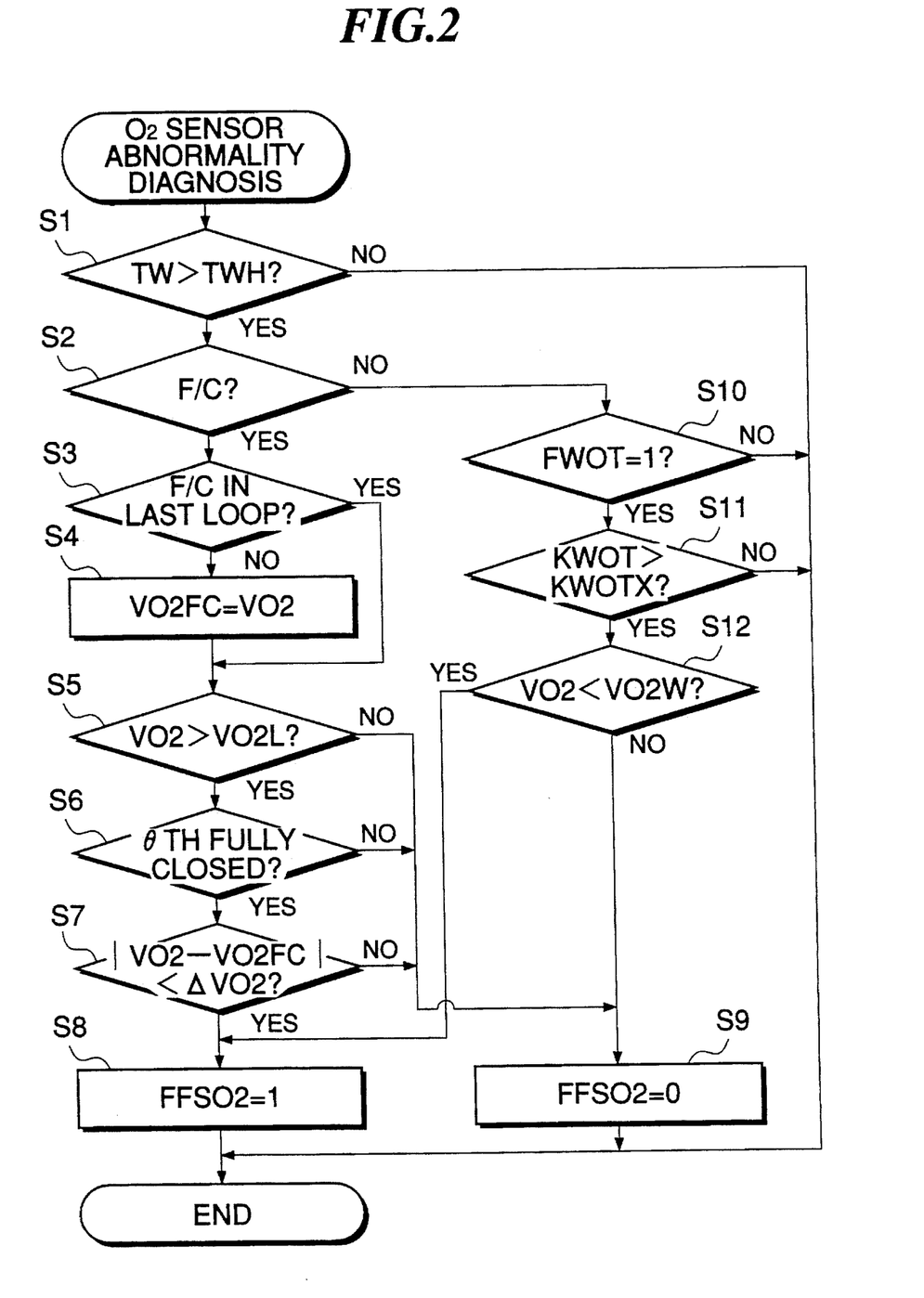
FIG. 2 is a flowchart of a routine for detecting abnormality of an oxygen concentration ($O_2$) sensor in FIG. 1.

FIG. 2 shows an abnormality diagnostic routine for detecting an abnormality in the $O_2$ sensor in FIG. 1. This program is executed in synchronism with generation of TDC signal pulses.

First, at a step S1, it is determined whether or not the engine coolant temperature TW is higher than a predetermined value TWH (e.g. 82° C.). If the answer is negative (NO), the program is immediately terminated, whereas if it is affirmative (YES), it is determined at a step S2 whether or not the engine 1 has entered a fuel-cut condition in the present loop. This question is made, e.g. based upon the engine rotational speed NE and the throttle valve opening θTH, by a fuel cut-determining routine, not shown.

When the answer to the question of the step S2 is affirmative (YES), it is determined at a step S3 whether or not the fuel-cut condition was also satisfied in the last loop. If the answer is affirmative (YES), the program proceeds to a step S5, whereas if the answer is negative (NO), i.e. if the engine has just entered the fuel-cut condition in the present loop, output voltage $VO_2F$ from the $O_2$ sensor 20 detected upon entering the fuel-cut condition is set to actual output voltage $VO_2$ from the $O_2$ sensor 20, at a step S4.

Then, at a step S5, it is determined whether or not the output voltage $VO_2$ from the $O_2$ sensor 20 is higher than a predetermined lower limit value $VO_2L$ (e.g. 3.0 volts). If the answer is affirmative (YES), it is determined at a step S6 whether or not the throttle valve 3' is fully closed. If the answer is affirmative (YES), it is determined at a step S7 whether or not the absolute value of the difference between the output voltage $VO_2$ detected in the present loop and the output voltage $VO_2FC$ detected upon entering the fuel-cut condition, i.e. the difference between the $VO_2$ value in the present loop and one in the last loop is smaller than a predetermined voltage value $\Delta VO_2$. If the answer is affirmative (YES), it means that the difference in the output voltage $VO_2$ from the $O_2$ sensor between the present loop and the last loop is small although the valve opening θTH of the throttle valve 3' shows a fully closed opening value. In other words, while no fuel injection is made when the throttle valve 3' is fully closed and accordingly the $O_2$ sensor 20 should properly show an output indicative of a lean value of oxygen concentration, actually the $O_2$ sensor 20 does not show a lean value as desired. In such a case, it is determined that there is a disconnection in the electric system of the $O_2$ sensor 20, and then a flag $FFSO_2$ is set to a value of "1" at a step S8, to show occurrence of abnormality of the $O_2$ sensor 20, followed by terminating the program.

On the other hand, when the answer to the question of at least one of the steps S5–S7 is negative (NO), it is determined that the $O_2$ sensor 20 is normally functioning, and then the flag $FFO_2$ is set to a value of "0", followed by terminating the program.

If the answer to the question of the step S2 is negative (NO), i.e. if it is determined that the engine 1 has not entered the fuel-cut condition, it is determined at a step S10 whether or not a flag FWOT assumes a value of "1" to determine whether or not the engine is in the aforementioned predetermined high load operating condition. If the answer is affirmative (YES), it is determined that the engine is in the predetermined high load operating condition, and then the program proceeds to a step S11 where it is determined whether or not the enriching coefficient KWOT is larger than a predetermined value KWOTX. If the answer is affirmative (YES), it is determined at a step S12 whether or not the output voltage $VO_2$ from the $O_2$ sensor is lower than a predetermined value $VO_2W$ (e.g. 0.06 volts). If the answer is affirmative (YES), it means that although the fuel amount is being increased and hence the output voltage $VO_2$ from the $O_2$ sensor 20 should properly show a higher value than $VO_2W$, actually the output voltage $VO_2$ shows a lower value than $VO_2W$. Therefore, it is determined that there is a short circuit in the electric system of the $O_2$ sensor 20, and then the flag $FFSO_2$ is set to "1" at the step S8, followed by terminating the program.

On the other hand, if the answer to the question of the step S10 or S11 is negative (NO), the flag $FFSO_2$ is set to "0" at a step S9, followed by terminating the program.

Figure 3:
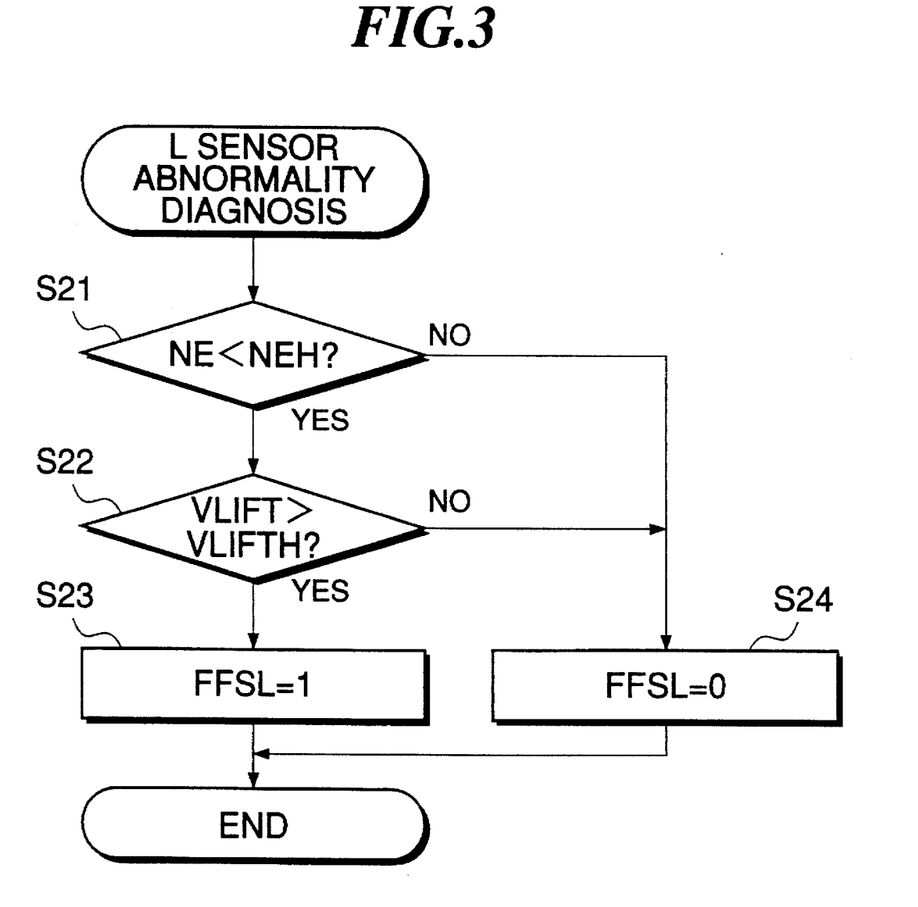
FIG. 3 is a flowchart of a routine for detecting abnormality of an exhaust control valve lift (L) sensor in FIG. 1.

FIG. 3 shows an abnormality diagnostic routine for detecting abnormality in the L sensor 35, which is executed in synchronism with false signal pulses generated at regular time intervals, e.g. 40 ms, by a timer incorporated in the ECU 5.

First, at a step S21, it is determined whether or not the engine rotational speed NE is lower than a predetermined upper limit value NEH (e.g. 4000 rpm) below which the EGR valve 22 operates. If the answer is affirmative (YES), it is determined at a step S22 whether or not output voltage VLIFT from the L sensor 35 is higher than a predetermined upper limit value VLIFTH (e.g. 4.88 volts). If the answer is affirmative (YES), it means that while the engine rotational speed NE falls within a region where the EGR valve 22 operates, the output voltage VLIFT from the L sensor 35 exceeds the predetermined upper limit value VLIFTH. Therefore, it is determined that the L sensor 35 is faulty, and then a flag FFSL is set to "1" at a step S23, followed by terminating the program. On the other hand, if the answer to the question of the step S21 or S22 is negative (NO), the flag FFSL is set to "0" at a step S24, followed by terminating the program.

Figure 4:
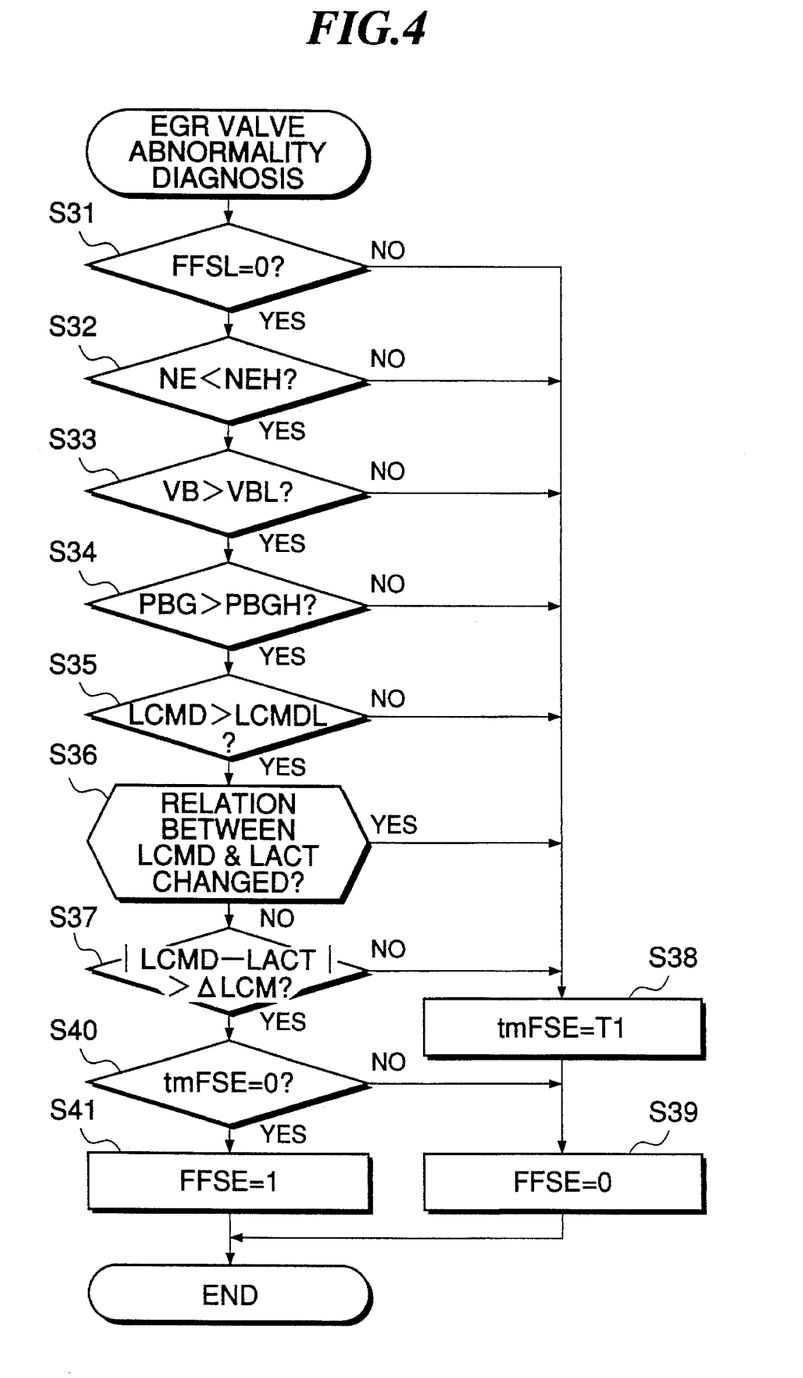
FIG. 4 is a flowchart of a routine for detecting abnormality of an exhaust gas recirculation (EGR) valve in FIG. 1.

FIG. 4 shows an abnormality diagnostic routine for detecting abnormality in the EGR valve 22, which is executed in synchronism with false signal pulses generated at regular time intervals, e.g. 40 ms, by a timer incorporated in the ECU 5.

First, at a step S31, it is determined whether or not the flag FFSL, which is set by the routine of FIG. 3, assumes "0", to determine whether the L sensor 35 is normally functioning. If the answer is affirmative (YES), it is determined at a step S32 whether or not the engine rotational speed NE is lower than the predetermined upper limit value NEH (e.g. 4000 rpm) below which the EGR valve 22 operates. If the answer is affirmative (YES), it is determined at a step S33 whether or not the battery voltage VB is higher than a predetermined lower limit value VBL (e.g. 10.5 volts) above which the EGR valve 22 can properly operate. If the answer is affirmative (YES), it is determined at a step S34 whether or not the difference between the atmospheric pressure PA and the intake pipe absolute pressure PBA, i.e. the intake pipe vacuum pressure (gauge pressure) is larger than a predetermined upper limit value PBGH (e.g. −190 mmHg). If the answer is affirmative (YES), a desired or command valve opening value LCMD for the EGR valve 22 (valve element 26) is larger than a predetermined lower limit value LCMDL (e.g. 1.2 mm). If the answer is affirmative (YES), the program proceeds to a step S36 where it is determined whether or not the relationship between the command valve opening value LCMD and an actual valve opening value LACT of the EGR valve 22 has changed between the last loop and the present loop, i.e. the relationship that the former is larger than the latter has changed to the relationship that the former is smaller than the latter or vice versa has changed between the last loop and the present loop. If the answer is negative (YES), i.e. if the relationship has not changed, it is determined at a step S37 whether or not the absolute value of the difference between the command valve opening value LCMD and the actual valve opening value LACT is larger than a predetermined value ΔLCM (e.g. 0.3 mm). If the answer is affirmative (YES), the program proceeds to a step S40.

On the other hand, if the answer to the question of at least one of the steps S31–S35 is negative (NO) or the answer to the question of the step S36 is affirmative (YES), the program proceeds to a step S38 where a timer tmFSE is set to a predetermined value T1 (e.g. 0.5 sec) and started, and a flag FFSE is set to "0" at a step S39, followed by terminating the program.

At the step S40, it is determined whether or not the timer value tmFSE is equal to 0, i.e. whether or not a time period corresponding to the predetermined value T1 has elapsed after the timer tmFSE was started. If the answer is negative (NO), the flag FFSE is set to "0" at the step S39, followed by terminating the program, whereas if the answer is affirmative (YES), it is determined that the EGR valve 22 is faulty, and then the flag FFSE is set to "1" at a step S41, followed by terminating the program.

That is, when the L sensor 35 is normally functioning and the operating pressure source for the EGR valve 22 supplies sufficient pressure thereto, normally the actual valve opening LACT of the EGR valve 22 should show a change toward the command valve opening value LCMD. However, if the difference between LACT and LCMD has continuously been larger than ΔLCMD over the time period T1 on such an occasion, it is presumed that the actual valve opening value LACT cannot follow the command valve opening value LCMD due to biting of dust or the like in the EGR valve 22. Thus, it is determined that there is an abnormality in the EGR valve 22.

Figure 5:
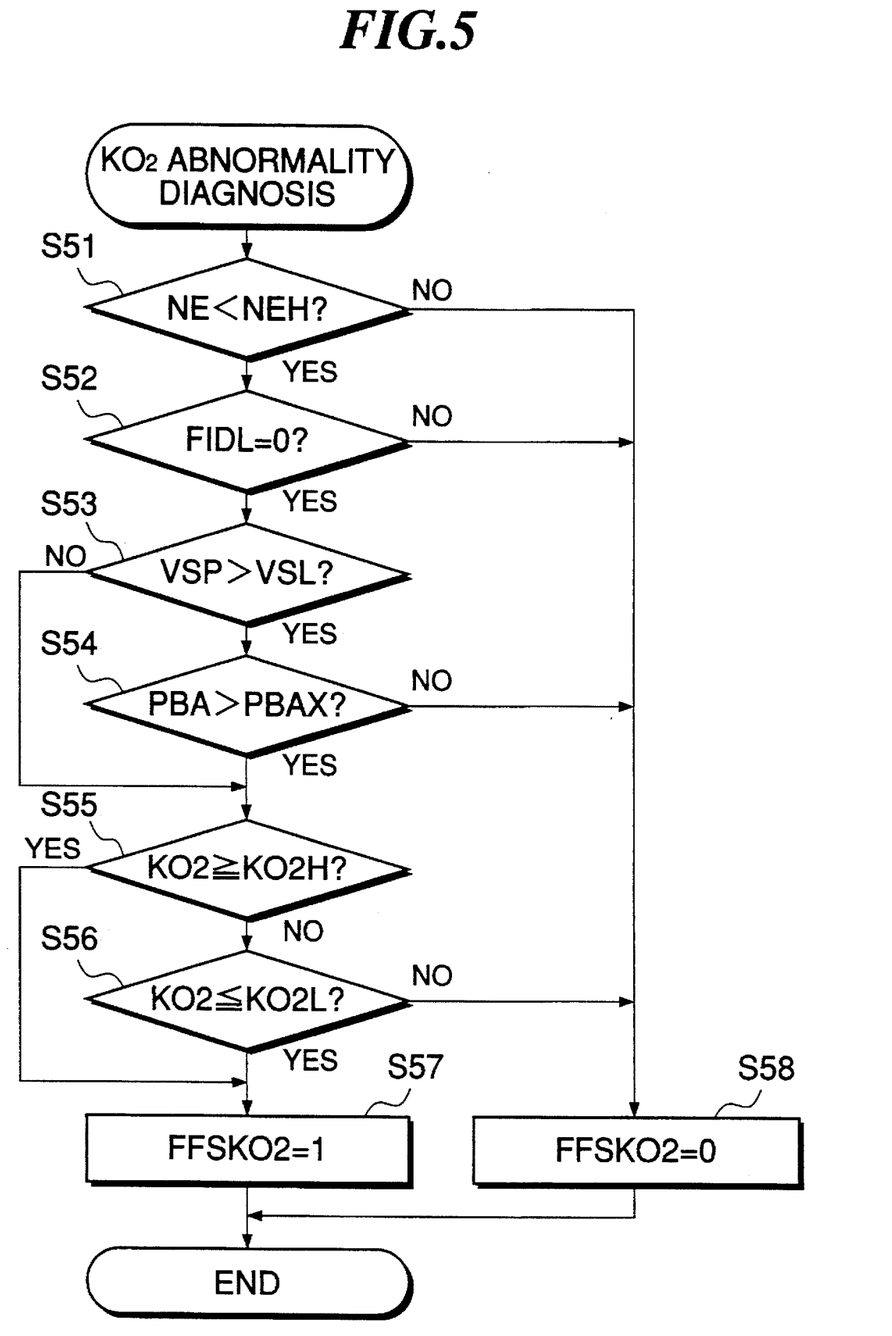
FIG. 5 is a flowchart of a routine for detecting abnormality of an air-fuel ration correction coefficient $KO_2$ used in air-fuel ratio feedback control of the engine.

FIG. 5 shows a $KO_2$ abnormality detecting routine which detects an abnormal value of the air-fuel ratio correction coefficient $KO_2$ which is one of control values used in executing the air-fuel ratio feedback control.

First, at a step S51, it is determined whether or not the engine rotational speed NE is lower than the predetermined upper limit value NEH. If the answer is affirmative (YES), it is determined at a step S52 whether or not a flag FIDL has been set to "0" to determine whether or not the engine is in an operating condition other than an idling condition. If the answer is affirmative (YES), i.e. if the engine is not idling, it is determined at a step S53 whether or not the vehicle speed VSP is higher than a predetermined lower limit value VSL (e.g. 5 km/hour). If the answer is negative (NO), the program proceeds to a step S55, whereas if the answer is affirmative (YES), it is determined at a step S54 whether or not the intake pipe absolute pressure PBA is higher than a predetermined value PBAX. If the answer is affirmative (YES), the program proceeds to the step S55.

At the step S55, it is determined whether or not the value of the air-fuel ratio correction coefficient $KO_2$ is larger than a predetermined upper limit value $KO_2H$ (e.g. 1.4). If the answer is affirmative (YES), it is determined that the correction coefficient $KO_2$ shows an abnormal value, and hence a flag $FFSKO_2$ is set to "1" at a step S57, followed by terminating the program.

On the other hand, if the answer to the question of the step S55 is negative (NO), it is determined at a step S56 whether or not the value of the correction coefficient $KO_2$ is smaller than a predetermined lower limit value $KO_2L$ (e.g. 0.75). If the answer is affirmative (YES), it is determined that the correction coefficient $KO_2$ shows an abnormal value, and hence the flag $FFSKO_2$ is set to "1" at the step S57, followed by terminating the program. That is, when the air-fuel ratio correction coefficient $KO_2$ falls outside a predetermined range (0.75–1.4) during air-fuel ratio feedback control, it is determined that the value of the correction coefficient $KO_2$ is abnormal.

If the answer to the question of at least one of the steps S51, S52, S54 and S56 is negative (NO), the flag $FFSKO_2$ is set to "0" at a step S58, followed by terminating the program.

Further, the CPU 5b also forms operating environmental change-determining means which determines, based upon the engine coolant temperature TW, whether there has been a change in the operating environment of the engine.

Figure 6:
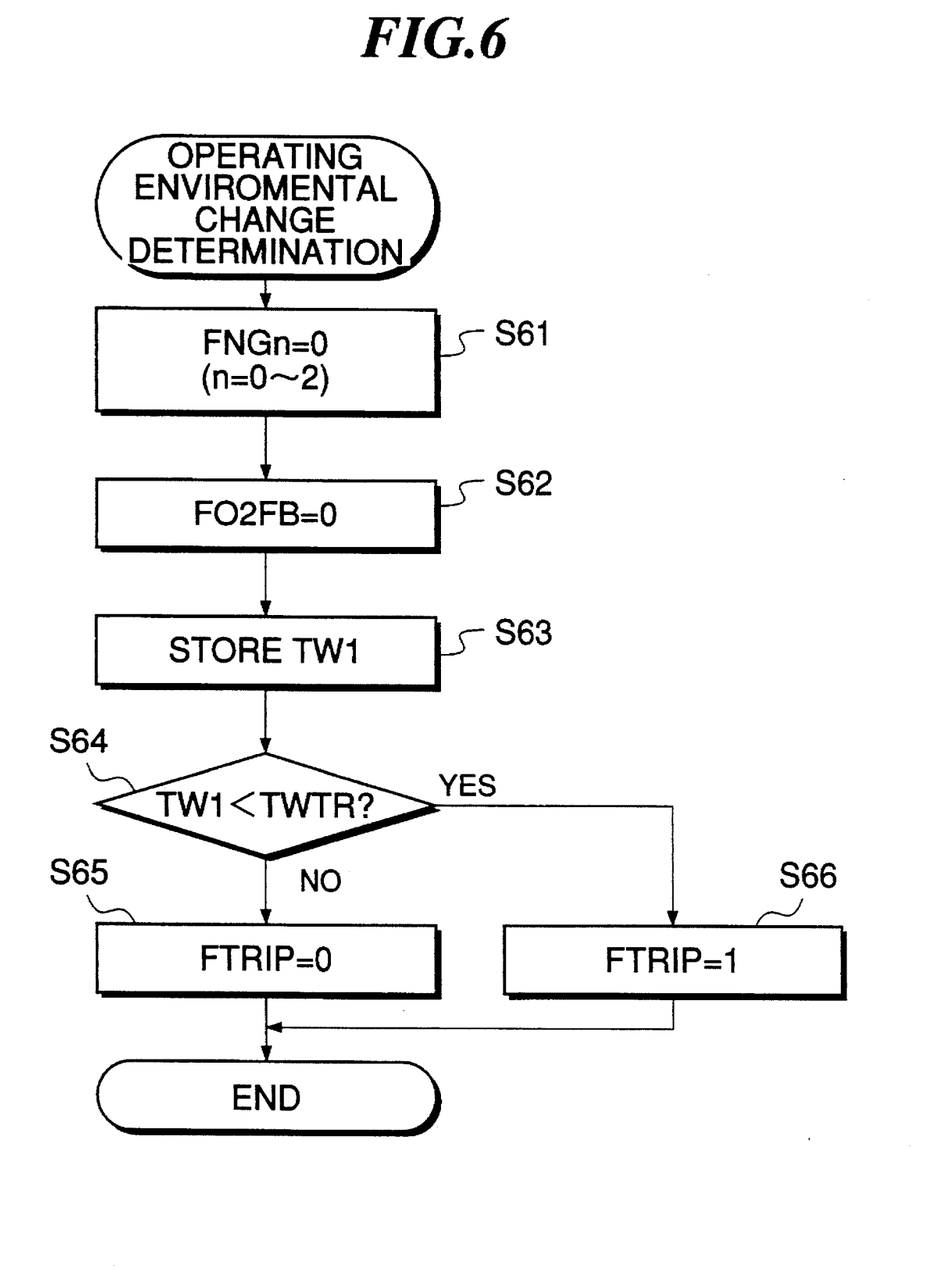
FIG. 6 is a flowchart of a routine for determining a change in the operating environment of the engine.

FIG. 6 shows a routine for determining a change in the operating environment of the engine, which is executed upon inputting of an ON signal from the IGSW 14 to the ECU 5.

First, at a step S61, a present occasion abnormality detection flag FNGn is set to "0" to indicate that there is no occurrence of abnormality on the present occasion of abnormality detection (n=0– 2, where 0 represents an FNG flag indicating detection of abnormality of the $O_2$ sensor when set to "1", 1 detection of abnormality of the EGR control system, and 2 detection of abnormality of the air-fuel ratio feedback control system, respectively). Then, at a step S62 a flag $FFO_2FB$, which permits execution of the air-fuel ratio feedback control when set to "1", is set to "0" to inhibit execution of the air-fuel ratio feedback control. Then, at a step S63 a value TW1 of the engine coolant temperature TW detected upon turning-on of the IGSW 14 is stored into the memory means 5c.

Then, it is determined at a step S64 whether the engine coolant temperature value TW1 is lower than a predetermined value TWTR. The predetermined value TWTR is set to an optional value close to a value assumed when the engine is being warmed up, e.g. a value within a range of 50°–60° C. If the answer is negative (NO), it is determined that no change has occurred in the operating environment of the engine, and hence an operating environmental change flag FTRIP is set to "0" at a step S65, followed by terminating the program.

On the other hand, if the answer to the question of the step S64 is affirmative (YES), that is, if the engine has been started in a cold state, it is determined that a change has occurred in the operating environment of the engine, that is, the engine coolant temperature has dropped after a predetermined time period elapsed from stoppage of the engine, and then the engine has been started. Then, the flag FTRIP is set to "1" at a step S66, followed by terminating the program.

Although in the operating environmental change-determining routine described above a change in the operating environment is determined based upon the engine coolant temperature TW, this is not limitative, but it may be determined based upon other engine operating parameters including intake air temperature TA, intake pipe absolute pressure PBA, engine rotational speed NE, or a combination of two or more of these parameters. Further, it may be determined based upon the time period elapsed after the engine is stopped.

Still further, the CPU 5b forms a centralized control system which controls in a centralized manner detection of abnormalities in various kinds of sensors and control variables. The centralized control system includes first abnormality-determining means which finally determines occurrence of an abnormality in any of particular input/output objects when the abnormality has been detected and at the same time a change has occurred in the operating environment of the engine, and second abnormality-determining means which finally determines occurrence of an abnormality in any of particular input/output objects when the abnormality has been detected and at the same time a predetermined signal from the SCS terminal 36 is inputted to the ECU 5.

Figure 7:
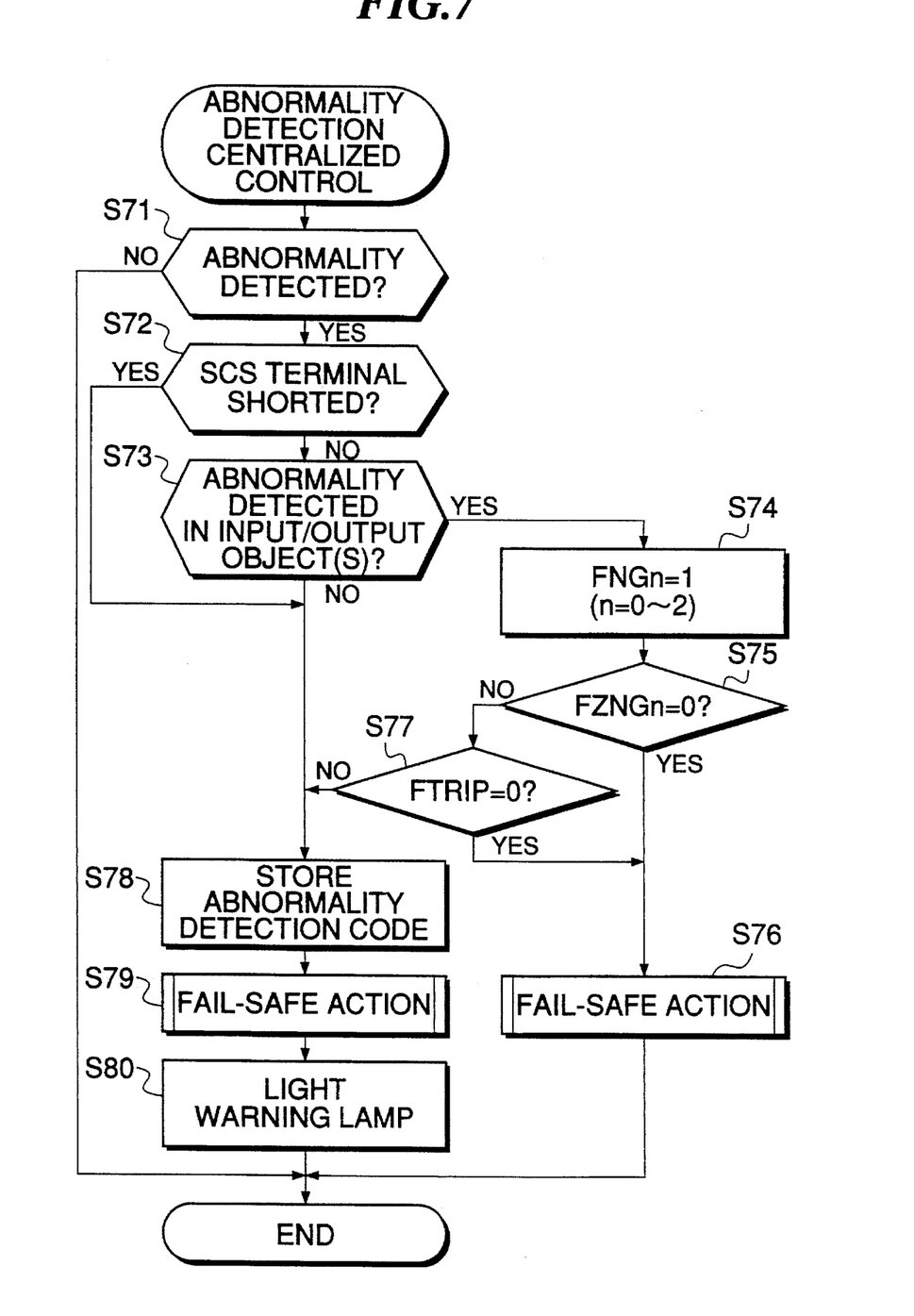
FIG. 7 is a flowchart of a routine for carrying out the operation of an abnormality detection centralized control system.

FIG. 7 shows a routine for carrying out the operation of the centralized control system for detection of abnormalities. This program is executed as background processing.

First, at step S71, it is determined whether or not an abnormality has been detected at one or more of particular locations in the engine including the particular input/output objects. If the answer is negative (NO), the program is immediately terminated, whereas if it is affirmative (YES), the program proceeds to a step S72 where it is determined whether or not the SCS terminal 36 is short-circuited. If the answer is negative (NO), the program proceeds to a step S73 where it is determined whether or not an abnormality has been detected in any of the particular input/output objects ($O_2$ sensor 20, L sensor 35, EGR valve 22, and correction coefficient $KO_2$). If the answer is affirmative (YES), the corresponding present occasion abnormality detection flag FNGn (n=0–2) is set to "1" at a step S74, followed by determining whether or not a corresponding last occasion abnormality detection flag FZNGn assumes "0" indicating that there was no detection of abnormality on the last occasion of abnormality detection (n=0–2, where 0 represents an FZNG flag indicating detection of abnormality of the $O_2$ sensor when set to "1", 1 detection of abnormality of the EGR control system, and 2 detection of abnormality of the air-fuel ratio feedback control system, respectively). If the answer is affirmative (YES), the program proceeds to a step S76.

On the other hand, if the answer to the question of the step S75 is negative (NO), i.e. if abnormality was detected at the same particular location on the last occasion, too, the program proceeds to a step S77 where it is determined whether or not the operating environmental change flag FTRIP assumes "0". If the answer is affirmative (YES), the program proceeds to the step S76.

At the step S76, a predetermined fail-safe action is carried out for the particular input/output object of which abnormality has been detected, followed by terminating the program. More specifically, when abnormality of the $O_2$ sensor has been detected, the value of the correction coefficient $KO_2$ is set to a predetermined fixed value; when the EGR control system is detected to be abnormal, the exhaust gas recirculation is interrupted; and when the air-fuel ratio feedback control system is detected to be abnormal, the air-fuel ratio feedback control is interrupted.

As described above, when an abnormality has been detected in any of the particular input/output objects such as the $O_2$ sensor on the present occasion for the first time, or when the abnormality was also detected on the last occasion but it is determined that no change has occurred in the operating environment due to starting of the engine in a warmed-up state, only the abnormality fail-safe action is carried out, without issuing a lighting command signal to the warning lamp, followed by terminating the program. In this manner, irrespective of whether the detected abnormality is a genuine abnormality or an incidental one, the abnormality fail-safe action alone is carried out. That is, the abnormality is not displayed or warned to the driver until the abnormality is finally determined to be a genuine one.

On the other hand, if the answer to the question of the step S73 or S77 is negative (NO), a corresponding predetermined abnormality detection code (which is previously set according to the sensors and control systems) is stored into the memory means 5c at a step S78, a fail-safe action corresponding to the stored code is carried out at a step S79, and a lighting command signal is supplied to the warning lamp at a step S80, followed by terminating the program. That is, when an abnormality is detected at a location other than the particular input/output objects, e.g. in the TW sensor 10, and when an abnormality is detected in any of the particular input/output objects both on the last occasion and on the present occasion and at the same time the engine has been started in a cold state, i.e. a change has occurred in the operating environment of the engine, the occurrence of the abnormality is finally determined, and then a corresponding predetermined fail-safe action is carried out at the step S79, and the warning lamp is lighted at the step S80 to warn the driver of the occurrence of the abnormality, followed by terminating the program.

On the other hand, the answer to the question of the step S72 becomes affirmative (YES), that is, the SCS terminal 36 is short-circuited, when the vehicle is under inspection for abnormality at the plant or at a service station. In this case, the program jumps to the step S78, followed by executing the steps S79 and S80. That is, when the vehicle is under inspection for abnormality at the plant or at a service station, the steps S73–S77 are not executed, but the occurrence of the abnormality is immediately finally determined to light the warning lamp. This enables prompt final determination of an abnormality detected during inspection of the vehicle at the plant, etc.

In the above described embodiment, the abnormality diagnoses of the particular input/out objects are carried out when the engine is in respective predetermined operating conditions, whereas the operating environmental change-determining routine of FIG. 6 is carried out merely if the IGSW 14 is turned on, as described before. As a result, there is a fear that if an abnormality was detected at any of the particular input/output objects on the last occasion, i.e. while the IGSW was on after it was turned off and until it was again turned off, and a corresponding one of the abnormality diagnostic routines of FIGS. 2–5 has not been executed after the IGSW 14 was turned on on the present occasion, the last occasion abnormality detection flag FZNGn, which was set to "1" on the last occasion, is set to "0" on the present occasion, so that even when an abnormality occurs in the particular input/output object, the occurrence of the abnormality is not finally determined.

In order to avoid the possibility of erasure of data on abnormality detected on the last occasion, mentioned above, according to the present embodiment, the CPU 5b includes erasing means which permits erasure of data on an abnormality detected in any of the particular input/output objects in the past and stored in the memory means 5c only on condition that a corresponding one of the abnormality diagnostic routines has been executed at least one time and at the same time no abnormality has been detected in the particular input/output object until the IGSW 14 is turned off.

Figure 8:
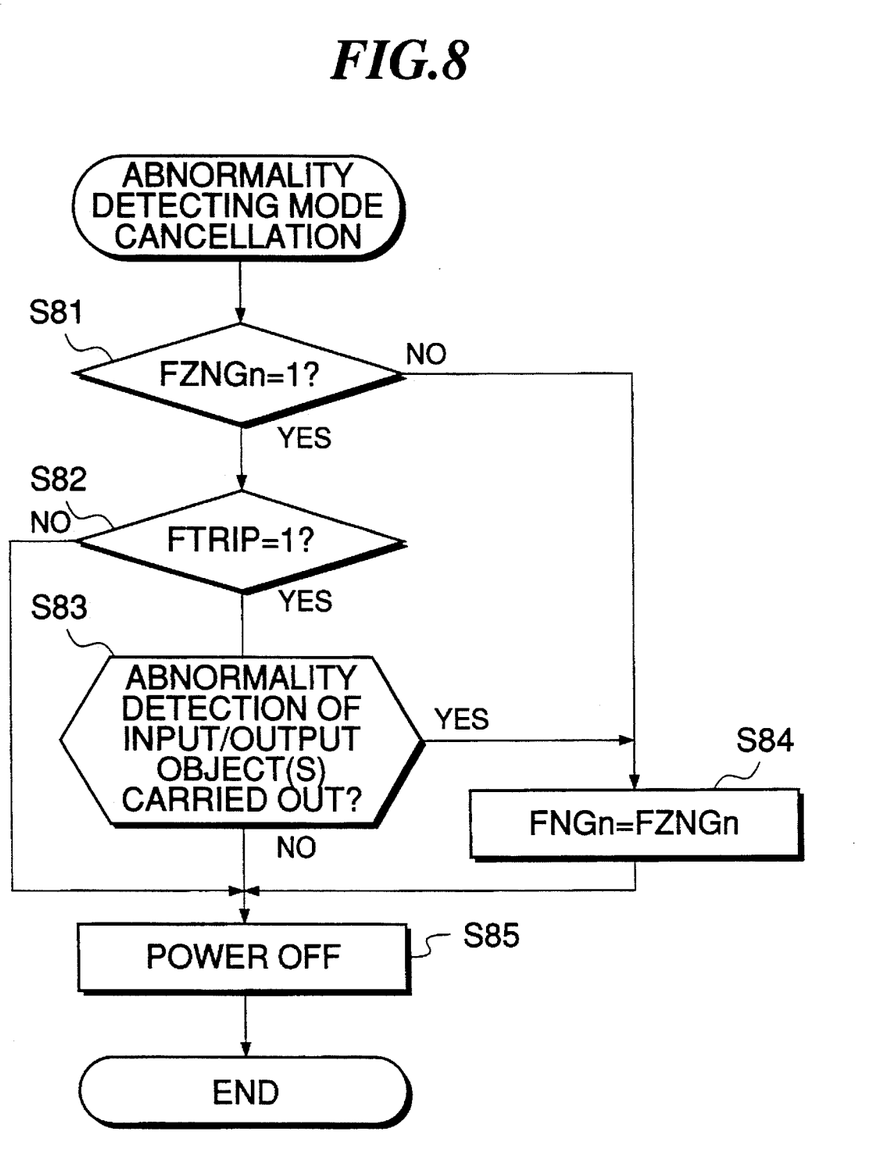
FIG. 8 is a flowchart of a routine for canceling an abnormality detecting mode.

FIG. 8 shows a routine for canceling the abnormality detecting mode, which is executed upon inputting of an OFF signal of the IGSW 14 to the ECU 5.

First, at a step S81, it is determined whether or not the last occasion abnormality detection flag FZNGn assumes "1" to determine whether or not an abnormality was detected in any of the particular input/output objects on the last occasion. If the answer is negative (NO), the program proceeds to a step S84 where the last occasion abnormality detection flag FZNGn is set equal to the present occasion abnormality detection flag FNGn, i.e. set to "0", and the ECU 5 is turned off (powered off) at a step S85, followed by terminating the program. On the other hand, if the answer to the question of the step S81 is affirmative (YES), it is determined whether or not the operating environmental change detection flag FTRIP assumes "1" at a step S82, to determine whether or not a change occurred in the operating environment of the engine. If the answer is negative (NO), the ECU 5 is powered off at the step S85, followed by terminating the program, whereas if the answer is affirmative (YES), it is determined at a step S83 whether or not detection of abnormality of the particular input/output object in which abnormality was detected on the last occasion was carried out at least one time after the IGSW 14 was turned on and until it was turned off (i.e. on the present occasion immediately before turning-off of the IGSW).

If the answer is negative (NO), that is, when no detection of abnormality of the particular input/output object was carried out after turning-on of the IGSW 14 and until turning-off of same because the engine never entered the corresponding predetermined operating condition, the ECU 5 is powered off at the step S85, followed by terminating the program.

On the other hand, if the answer to the question of the step S83 is affirmative (YES), there are two cases. That is, in the case where no abnormality was detected in the particular input/output object on the present occasion (FNGn=0), the value of "1" of the last occasion abnormality detection flag FZNGn is erased, i.e. the flag FZNGn is set to "0" at a step S84, followed by powering off the ECU 5 and terminating the program, whereas in the case where abnormality was detected in the particular input/output object on the present occasion (FNGn="1"), the value of "1" of the last occasion abnormality detection flag FZNGn is maintained as it is (FZNGn="1") at the step S84, followed by powering off the ECU 5 and terminating the program.

What is claimed is:

1. In an abnormality diagnostic system for an internal combustion engine, including abnormality detecting means for detecting abnormalities of input/output objects used in controlling operation of said engine when said engine is in respective predetermined operating conditions, and fail-safe means for carrying out respective predetermined fail-safe actions when abnormalities of said input/output objects are detected by said abnormality-detecting means;

the improvement comprising:

operating environmental change-determining means for determining whether there has occurred a change in operating environment of said engine between when said abnormality-detecting means detected an abnormality of said input/output objects on a last occasion and when it has detected said abnormality on a present occasion; and abnormality-determining means for finally determining occurrence of said abnormality of said input/output objects when said abnormality has been detected by said abnormality-detecting means and at the same time it is determined by said operating environmental change-determining means that a change in the operating environment of said engine has occurred between when said abnormality-detecting means detected said abnormality on the last occasion and when it has detected said abnormality on the present occasion.

2. An abnormality diagnostic system as claimed in claim 1, including display means for displaying said abnormality when the occurrence of said abnormality has been finally determined by said abnormality-determining means.

3. An abnormality diagnostic system as claimed in claim 1 or 2, wherein said operating environmental change-determining means determines that a change in the operating environment of said engine has occurred, when temperature of said engine is lower than a predetermined value at the start of said engine.

4. An abnormality diagnostic system as claimed in claim 3, wherein the temperature of said engine is temperature of coolant in said engine.

5. An abnormality diagnostic system as claimed in claim 1 or 2, including detected abnormality data-storing means for storing data on abnormality of each of said input/output objects detected by said abnormality-detecting means, and stored abnormality data-erasing means for erasing the data on said abnormality of said each input/output object previously stored in said detected abnormality data-storing means when no abnormality is detected in said each input/output object by said abnormality-detecting means on the present occasion.

6. An abnormality diagnostic system as claimed in claim 1 or 2, including input terminal means for inputting a predetermined external signal for checking said engine or a control system thereof, and wherein when said predetermined external signal is inputted to said input terminal means, said abnormality-determining means finally determines occurrence of an abnormality of each of said input/output objects immediately when said abnormality of said each input/output object has been detected by said abnormality-detecting means, irrespective of whether or not it is determined by said operating environmental change-determining means that a change in the operating environment of said engine has occurred.

7. An abnormality diagnostic system as claimed in claim 1 or 2, wherein said input/output objects include an oxygen concentration sensor used in an air-fuel ratio feedback control system for controlling an air-fuel ratio of a mixture supplied to said engine.

8. An abnormality diagnostic system as claimed in claim 1 or 2, wherein said input/output objects include an exhaust gas recirculation amount control valve for controlling recirculation of exhaust gases from an exhaust system of said engine to an intake system thereof.

9. An abnormality diagnostic system as claimed in claim 1 or 2, wherein said input/output objects include a valve opening sensor for sensing valve opening of an exhaust gas recirculation amount control valve.

10. An abnormality diagnostic system as claimed in claim 1 or 2, wherein said input/output objects include a correction value used in an air-fuel ratio feedback control system for controlling an air-fuel ratio of a mixture supplied to said engine.

* * * * *